Figure 1:
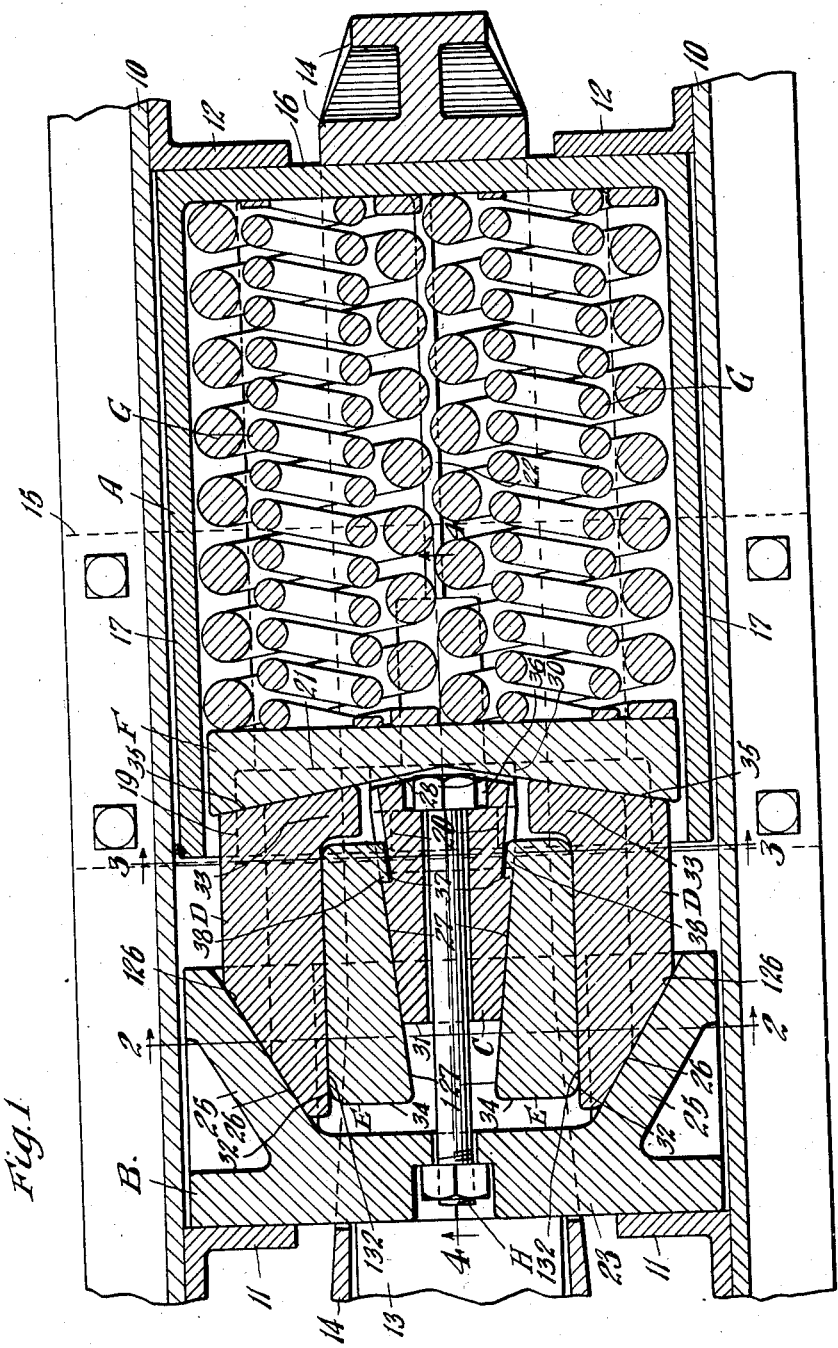

Sept. 18, 1928.  S. B. HASELTINE  1,684,539
FRICTION SHOCK ABSORBING MECHANISM
Filed Dec. 24, 1926   2 Sheets-Sheet 1

Witness
Wm. Geiger

Inventor
Stacy B. Haseltine
By George I. Haight
His Atty.

Sept. 18, 1928.  1,684,539
S. B. HASELTINE
FRICTION SHOCK ABSORBING MECHANISM
Filed Dec. 24, 1926  2 Sheets-Sheet 2
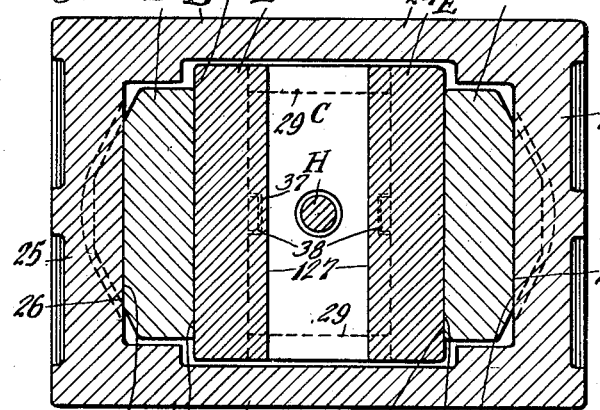
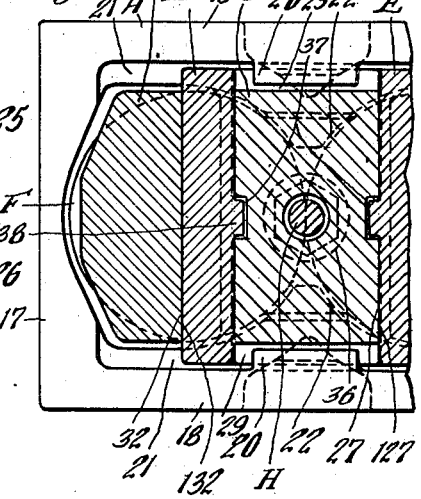
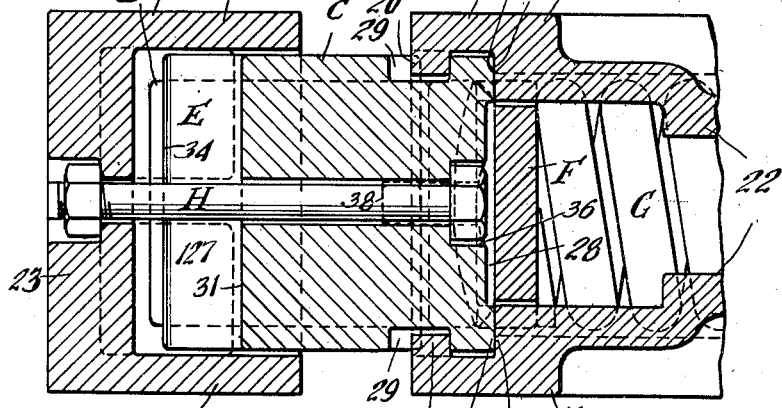
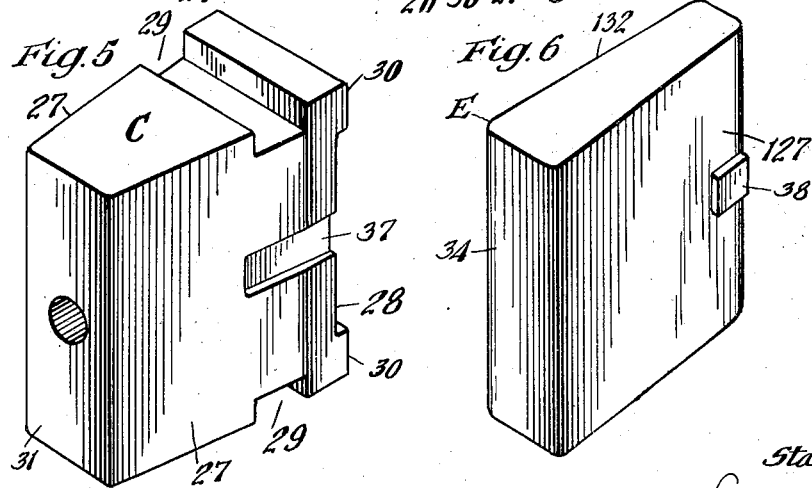
Witness
Wm. Geiger
Inventor
Stacy B. Haseltine
By George I. Haight
His Atty.

Patented Sept. 18, 1928.

1,684,539

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 24, 1926. Serial No. 156,821.

This invention relates to improvements in friction shock absorbing mechanisms.

One object of the invention is to provide a friction shock absorbing mechanism especially adapted for railway draft riggings, having great column strength, together with high frictional capacity and assured release.

Another object of the invention is to provide a friction shock absorbing mechanism of the character indicated, including a plurality of relatively movable friction elements, wherein the elements are operated in succession to provide stages of increasing graduated frictional resistance, a differential action being provided between certain of said elements to produce additional capacity.

Another object of the invention is to provide a friction shock absorbing mechanism including a spring cage and friction post associated therewith, a plurality of friction elements co-operating with the post, and spring means opposing relative movement of the post and friction elements, wherein a spring cage of maximum column strength is provided and the arrangement is such as to provide the greatest possible spring space within the cage.

Other objects and advantages of the invention will more fully and clearly appear from the description and claims hereinafter following.

In the drawings, forming a part of this specification, Figure 1 is a horizontal, longitudinal, sectional view of a portion of a railway draft rigging showing my improvements in connection therewith. Figures 2 and 3 are transverse vertical sectional views corresponding respectively to the lines 2—2 and 3—3 of Figure 1, Figure 3 being partly broken away. Figure 4 is a vertical, longitudinal, sectional view of the front end of the mechanism, illustrated in Figure 1, corresponding substantially to the line 4—4 of said figure. And Figures 5 and 6 are detailed perspective views respectively of the friction post and one of the friction members of my improved mechanism.

In said drawings, 10—10 indicate channel-shaped center or draft sills of a railway car underframe to the inner faces of which are secured the usual front stop lugs 11—11 and rear stop lugs 12—12. The inner end portion of the drawbar is designated by 13, to which is operatively connected a yoke 14. The shock absorbing mechanism proper is disposed within the yoke and the yoke and the parts contained therewithin are supported in operative position by a detachable saddle plate 15 secured to the draft sills.

My improved shock absorbing mechanism proper comprises broadly a spring cage A functioning as a rear follower; a wedge casing B functioning as a front follower; a friction post C; two friction shoes D—D; two friction members or blocks E—E; a spring follower F; twin arranged main spring resistance elements G—G; and a retainer bolt H.

The spring cage A is in the form of a substantially rectangular box-like casting having a transverse vertically disposed rear end wall 16 co-operating with the stop lugs 12, longitudinally disposed vertical side walls 17—17 and horizontally disposed longitudinally extending top and bottom walls 18—18. The forward end portion of the cage is of substantially rectangular interior outline as indicated at 19 in Figure 1. At the extreme forward ends, the top and bottom walls 18 are provided with inwardly projecting short flanges 20—20 which co-operate with the friction post to retain the same assembled with the spring cage in a manner hereinafter described. Rearwardly of the flanges 20, the top and bottom walls are provided with transverse abutment faces 21—21 extending entirely across the cage. The side walls 17 of the cage have the interior surfaces therof formed to conform with the outer contour of the coils of the spring resistance elements G. The cage A is also provided with longitudinally disposed top and bottom ribs 22—22 extending longitudinally thereof and having surfaces conforming to the contour of the coils of the springs, the ribs serving to increase the column strength of the cage.

The wedge casing B is also in the form of a substantially box-like casting having the transverse front end wall 23 co-operating with the stop lugs 11, horizontally disposed top and bottom walls 24—24, and rearwardly diverging side walls 25—25. The side walls are provided with interior flat rearwardly diverging wedge faces 26—26 which co-operate with the friction shoes D.

The friction post C, as most clearly shown in Figures 1, 4 and 5, is in the form of a heavy block having rearwardly diverging flat friction surfaces 27—27 on the opposite sides thereof. Adjacent their inner ends and centrally thereof, the surfaces 27—27 are provided with recesses 37 the forward shoulder whereof co-operates with the member E in a manner hereinafter described. At the inner end, the post is cut away between the top and bottom edges thereof as indicated at 28 to clear the inclined front faces on the spring follower F. The top and bottom edges of the post C are transversely slotted as indicated at 29 to receive the flanges 20 of the top and bottom walls of the cage A. The top and bottom rear faces at the inner end of the post C which are designated by 30 are adapted to bear on the transverse abutment surfaces 21 of the cage A. It will be seen upon reference to Figures 1, 2 and 5 that the post may be assembled with the cage A by inserting the post from the forward end thereof until the slots 29 register with the flanges 20 of the cage, whereupon the post is slid laterally of the cage, thereby engaging the flanges 20 within the slots and anchoring the post to the cage. At the forward end, the post is provided with a transverse flat abutment face 31 adapted to co-operate with the inner side of the end wall 23 of the wedge casing in a manner hereinafter described.

The friction shoes D which are two in number, are disposed at opposite sides of the mechanism. The shoes D are of like design, each being provided with an outer wedge face 126 adapted to co-operate with the corresponding wedge face 26 of the wedge casing. On the inner side, each shoe is provided with a longitudinally disposed flat friction surface 32 adapted to co-operate with the corresponding friction member E. At the inner end, each shoe is provided with a lateral inward extension or enlargement 33 adapted to co-operate with the inner end of the corresponding friction member E and serve as a means for positively restoring the friction element E to normal position as hereinafter described.

The friction members E, which are in the form of relatively heavy blocks are two in number and are interposed between the friction shoes D and the friction post C. Each of the blocks E is provided with an outer longitudinally disposed flat friction surface 132 adapted to co-operate with the corresponding friction surface 32 of one of the friction shoes D and a flat inner end face adapted to co-operate with the lateral enlargement 33 of the shoe. On the inner side, each friction element E is provided with an inclined flat friction surface 127 co-operating with the friction surface 27 at the same side of the friction post C. At the forward end, each friction element E has a flat transverse end face 34 adapted to co-operate with the inner surface of the transverse end wall 23 of the wedge casing in a manner hereinafter described. As will be clear from Figure 1, the end faces 34 of the friction members E are normally spaced from the inner surfaces of the end wall 23 of the wedge casing B. At the rear end each element E is provided with an inwardly projecting lateral lug 38 working in the corresponding recess 37 and adapted to engage the shoulder at the outer end of said recess to limit outward movement of the element E.

The spring follower F which is in the form of a heavy plate-like member, is interposed between the spring resistance elements G and the inner ends of the friction shoes D. As most clearly shown in Figure 1, the front face of the spring follower F is cut away to provide transversely inclined surfaces 35 which co-operate with the inner ends of the friction shoes D and serve to hold the latter more closely in engagement with the friction surfaces of the post C.

The spring resistance elements G comprise twin arranged sets of spring coils, each set comprising an inner relatively light coil and an outer relatively heavier coil having their opposite ends bearing respectively on the end walls 16 of the cage and the inner side of the spring follower F. As most clearly shown in Figures 1 and 3, the spring coils are of such a size as to occupy substantially the entire available spring space within the cage A, thereby providing a spring resistance means of maximum capacity. It will further be noted that inasmuch as the side walls of the spring cage are left intact, the cage itself presents a column element of exceptionally great strength. The mechanism is held of uniform overall length and in assembled relation by the retainer bolt H which is anchored to the friction post C and the wedge casing B respectively, the head of the bolt being accommodated in a recess 36 at the inner end of the post and the nut of the bolt being seated in a recess in the end wall 23 of the wedge casing, the shank of the bolt extending through a longitudinal bore in the post C. The retainer bolt serves not only to maintain the parts assembled, but also provides means for adjusting the parts and holding the springs under an initial compression.

It will be noted that the spring follower is normally slightly spaced from the inner end of the post, thereby providing for compensation for wear of the friction and wedge faces of the parts of the mechanism, the springs G which are under initial compression tending to force the spring follower F outwardly and maintain the friction shoes D in engagement with the wedge faces 26 of the wedge casing B, the shoes in turn holding the friction members E in contact with the friction surfaces of the post C.

In assembling the parts of the mechanism, the spring coils and the spring follower F are inserted within the cage from the forward end thereof. These parts are then compressed and the friction post assembled with the cage in the manner hereinbefore pointed out. The friction members E, wedge friction shoes D, and wedge casing B are then assembled with the cage A, and the parts secured by the retainer bolt H.

The operation of my improved shock absorbing mechanism during a compression stroke is as follows: The spring cage and wedge casing will be moved relatively toward each other, thereby forcing the shoes D inwardly of the cage and compressing the springs G. During this action, due to the inter-engaging wedge faces on the shoes and wedge casing, the shoes will be forced laterally against the friction members E and the latter will in turn be forced into tight frictional engagement with the friction post C. Due to the fact that the co-operating friction surfaces of the friction members E and the post C are inclined with respect to the co-operating friction surfaces of the members E and the friction shoes D, greater resistance to movement will exist between the post and friction members E than between the latter and the shoes D. The initial action will thus be an inward movement of the shoes D on the friction surfaces of the friction members E. This action will continue until the clearance between the outer ends of the friction members E and the transverse end wall of the wedge casing B is taken up, whereupon the friction members E will be engaged by the casing and carried rearwardly in unison therewith, slipping on the diverging friction surfaces of the post C. Due to the diverging relation of the surfaces of the post, a differential action will be effected, thereby causing a lateral outward movement of the friction members E and the shoes D, the latter slipping on the wedge faces 26 of the wedge casing B and the friction faces 132 of the members E. The shoes will thus move inwardly at a more rapid rate than the friction members E and the wedge casing, thereby effecting additional compression of the main springs G. It will be evident that due to the diverging relation of the co-operating friction surfaces of the post C and the friction members E, greater resistance will be offered during this last described stage of the operation than during the relative movement of the shoes and the friction members E. The compression of the mechanism as described will continue either until the actuating force is reduced or the inner end of the wedge casing comes into engagement with the spring cage, whereupon the pressure will be transmitted directly through the wedge casing and the spring cage to the stop lugs of the draft sills. At the same time, the rear ends of the friction members E, which have their front ends engaged by the end wall 23 of the wedge casing B, will come into engagement with the transverse abutment surfaces 21 of the cage and the front end of the post C will also be engaged by the inner face of the end wall 23 of the wedge casing B. In other words, the friction post and the friction members E, together with the wedge casing B and the spring cage A, form a solid column load sustaining element to transmit the actuating force when the mechanism is fully compressed, thereby preventing undue compression of the springs G.

When the actuating force is reduced, the expansive action of the springs G will carry the spring follower F outwardly, carrying the friction shoes D and wedge casing B therewith. As the friction shoes D are carried outwardly there will be a tendency for the friction elements E to move outwardly therewith due to the friction between these parts, outward movement of the elements E being finally limited by the lugs 38 of the friction elements engaging the shoulders on the post C. In case of slippage between the shoes and friction elements during release the enlargements 33 of the shoes will come into engagement with the rear ends of the friction members E and positively restore the latter to the normal position illustrated in Figure 1. Outward movement of the parts is limited by the retainer bolt H which as hereinbefore pointed out is anchored to the post C and the wedge casing B.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction post having inwardly diverging friction surfaces; of a follower acting means, said means and post being movable toward and away from each other, said follower having laterally inwardly acting wedge means movable therewith; friction shoes having wedging engagement with said wedge means; friction elements interposed between the shoes and post and having friction surfaces co-operating therewith, the co-operating surfaces of said post and friction elements being inclined with respect to the co-operating friction surfaces of the shoes and friction elements, whereby said last named co-operating surfaces will offer less resistance to longitudinal movement than the remaining co-operating surfaces, said friction elements being normally spaced from the follower acting means a distance less than the full compression stroke of the mechanism, whereby when said mechanism is compressed to a predetermined extent, the friction elements will be forced to move relatively to the post; and spring means yieldingly opposing movement of the shoes inwardly of the mechanism.

2. In a friction shock absorbing mechanism, the combination with a post provided with friction surfaces; of a main follower having inwardly acting wedge faces, said follower and post being relatively movable toward and away from each other; friction shoes having wedging engagement with the follower; friction members having friction surfaces co-operating with the post friction surfaces, said members and shoes also having co-operating friction surfaces, the co-operating surfaces of the members and post being inclined with respect to the co-operating surfaces of said friction members and shoes, said friction members being normally spaced from said main follower and adapted to be engaged and moved thereby, after a predetermined relative movement of the shoes and members; and spring resistance means yieldingly opposing relative movement of the shoes and post.

3. In a friction shock absorbing mechanism, the combination with a spring cage having a detachable friction post thereon, said post being provided with inwardly diverging friction surfaces; of a main follower having inwardly acting wedge faces thereon, said follower and cage being relatively movable toward and away from each other and said follower engaging the cage to limit relative movement thereof when the mechanism is fully compressed; friction shoes having wedging engagement with the wedge faces of the follower, said shoes having longitudinally disposed friction surfaces; friction members having friction surfaces co-operating respectively with the friction surfaces of the post and shoes, said members being normally spaced from the follower and cage and adapted to be engaged by said follower and moved thereby after a predetermined compression of the mechanism, said members engaging the follower and cage simultaneously with engagement of the cage by the follower when the mechanism is fully compressed to form a solid column load sustaining member; and spring resistance means within the cage opposing relative movement of the cage and shoes.

4. In a friction shock absorbing mechanism, the combination with a spring cage having a detachable friction post thereon, said post being provided with inwardly diverging friction surfaces; of a main follower having inwardly acting wedge faces thereon, said follower being normally spaced from said post and adapted to engage the outer end of the latter when the mechanism is fully compressed to transmit the load to the cage, said follower and cage being relatively movable toward and away from each other, and said follower engaging the cage to limit relative movement thereof simultaneously with engagement of the post by the follower when the mechanism is fully compressed; friction shoes having wedging engagement with the wedge faces of the follower, said shoes having longitudinally disposed friction surfaces; friction members having friction surfaces co-operating with the friction surfaces of the post and shoes, said members being normally spaced from the follower and cage and adapted to be engaged by the follower and moved thereby after a predetermined compression of the mechanism, said members engaging the follower and cage simultaneously with engagement of the post and cage by the main follower when the mechanism is fully compressed, said follower, post, friction members, and cage forming a solid column load sustaining member to transmit the actuating force; and spring resistance means within the cage co-operating with the shoes.

5. In a friction shock absorbing mechanism, the combination with a friction post having inclined friction surfaces; of a main follower, said follower and post being relatively movable toward and away from each other; friction members having friction surfaces co-operating with the friction surfaces of the post, said friction elements being normally spaced from said main follower and adapted to be engaged and moved thereby after a predetermined compression of the mechanism; friction shoes co-operating with the friction members, said shoes and members having longitudinally disposed co-operating friction surfaces, said shoes also having means thereon adapted to engage said members to restore the latter to normal position when the mechanism is released, said shoes and main follower having co-operating means thereon for forcing the shoes laterally against the friction elements; and spring resistance means yieldingly opposing inward movement of the shoes.

6. In a friction shock absorbing mechanism, the combination with a spring cage of rectangular box-like form having an end wall and continuous top, bottom and side walls, the cage being open at the forward end and having retaining means thereon; a detachable friction post having means co-operating with the retaining means of the cage to anchor said post to the cage; a pair of twin arranged spring resistance elements within the cage and occupying substantially the entire spring space thereof; friction elements co-operating with the friction post; and wedge means for forcing said friction elements into engagement with the friction post, said wedge means and spring cage being relatively movable toward and away from each other.

In witness that I claim the foregoing I have hereunto subscribed my name this 20th day of December 1926.

STACY B. HASELTINE.